United States Patent
Wilcox (10) Patent No.: US 12,379,976 B2
(45) Date of Patent: Aug. 5, 2025

(54) RUNTIME DEPENDENCY CONFIGURATION UTILITY

(71) Applicant: Insight Direct USA, Inc., Tempe, AZ (US)

(72) Inventor: James Wilcox, Merrimack, NH (US)

(73) Assignee: Insight Direct USA, Inc., Chandler, AZ (US)

( * ) Notice: Subject to any disclaimer, the term of this patent is extended or adjusted under 35 U.S.C. 154(b) by 256 days.

(21) Appl. No.: 17/977,806

(22) Filed: Oct. 31, 2022

(65) Prior Publication Data

US 2024/0118944 A1 Apr. 11, 2024

Related U.S. Application Data

(60) Provisional application No. 63/413,458, filed on Oct. 5, 2022.

(51) Int. Cl.
| | |
|---|---|
| *G06F 9/445* | (2018.01) |
| *G06F 9/52* | (2006.01) |
| *G06F 9/54* | (2006.01) |
| *G06F 8/36* | (2018.01) |

(52) U.S. Cl.
CPC .............. *G06F 9/541* (2013.01); *G06F 8/36* (2013.01); *G06F 9/44521* (2013.01)

(58) Field of Classification Search
None
See application file for complete search history.

(56) References Cited

U.S. PATENT DOCUMENTS

| | | | |
|---|---|---|---|
| 7,305,666 B2 | 12/2007 | Burger et al. | |
| 8,584,106 B2 | 11/2013 | Papakipos et al. | |
| 9,483,242 B2 | 11/2016 | Goetz et al. | |
| 2013/0185715 A1* | 7/2013 | Dunning | G06F 9/45558 718/1 |
| 2014/0019597 A1* | 1/2014 | Nath | H04L 41/0843 709/220 |
| 2019/0377560 A1* | 12/2019 | Papageorgiou | G06F 8/4443 |
| 2023/0161693 A1 | 5/2023 | Herington et al. | |
| 2023/0289145 A1* | 9/2023 | Danashekar | G06F 8/54 |

OTHER PUBLICATIONS

Blundell et al.; "Retcon: Transactional Repair without Replay"; Jun. 19, 2010; ACM SIGARCH Computer Architecture News; vol. 38, Issue 3; pp. 258-269) (Year: 2010).*

* cited by examiner

*Primary Examiner* — Umut Onat
(74) *Attorney, Agent, or Firm* — Kinney & Lange, P.A.

(57) ABSTRACT

A method is presented for executing an application having multiple mutually-exclusive possible dependencies associated with an interface. First, a repository of implementations is scanned using a configuration utility to identify a subset of the implementations tagged for usability with the configuration utility. The configuration utility identifies keys within each of the subset of implementations, and filters the implementations by these configuration keys. The configuration utility scans configurations for a match with any of the identified configuration keys, and selects one implementation from among the subset of the implementations for dependency injection based on matching of configurations with the identified configuration keys. The configuration utility then injects a dependency using the selected implementation, and initializes configurations specific to the injected dependency.

19 Claims, 7 Drawing Sheets

```
1   {
2       "ImplementationAssemblySearch": "MainAPI.API.*.dll;Insight.Enterprise.*.dll"
3       "Logging": {
4           "LogLevel": {
5               "Default": "Information",
6               "Microsoft": "Information",
7               "Microsoft.Hosting.Lifetime": "Information"
8           }
9       },
10      "Middleware": {
11          "ErrorHandlingMiddleware": null,
12          "LoggingMiddleware": null
13  
```

```
7   [RetCon(typeof(IDistributedCache), ServiceLifetime = ServiceLifetime.Singleton)]
8   1 reference|Jim Wilcox 1 day ago| 1 author, 1 change
9   public class NoCache : IDistributedCache
10  {
        0 reference | Jim Wilcox, 1 day ago | 1 author, 1 change
11      public byte[ ]? Get(string key) => null;
12
        0 reference|Jim Wilcox 1 day ago| 1 author, 1 change
```

FIG. 4A

```
 1  {
 2      "ImplementationAssemblySearch": "MainAPI.API.*.dll;Insight.Enterprise.*.dll"
 3      "MockDistributedCache": true,
 4      "Logging": {
 5          "LogLevel": {
 6              "Default": "Information",
 7              "Microsoft": "Information",
 8              "Microsoft.Hosting.Lifetime": "Information"
 9          }
10      },
11      "Middleware": {
12          "ErrorHandlingMiddleware": null,
13          "LoggingMiddleware": null
14      }
15  }
```

```
 9  /// <summary>
10  /// Wraps a memory cache as a mock distributed cache for cases where theres no distributed cache configured.
11  /// </summary>
12  [RetCon(typeof(IDistributedCache), ServiceLifetime = ServiceLifetime.Singleton, WhenConfigured = nameof(MockDistributedCache))]
13  3 reference|Jim Wilcox 1 day ago| 1 author, 1 change
14  public class MockDistributedCache : MemoryCache, IDistributedCache
15  {
16      0 reference|Jim Wilcox 1 day ago| 1 author, 1 change
17      public MockDistributedCache(IOptions<MemoryCacheOptions> optionAccessor) : base(optionsAccessor)
18  }
```

FIG. 4B

```
{
"ImplementationAssemblySearch": "MainAPI.API.*.dll;Insight.Enterprise"
"RedisCacheOptions": {
  "Configuration": "localhost:6379",
  "ConfigurationOptions": {
    "AbortOnConnectFail": true,
    "AllowAdmin": false,
    "AsyncTimeout": 5000,
    "UseSsl": false,
    "ChannelPrefix": { "IsNullOrEmpty": true },
    "ClientName": null,
    "ConnectRetry": 3,
    "CommandMap": { },
    "ConfigurationChannel": "__Booksleeve_MasterChanged:",
    "ConnectTimeout": 5000,
    "DefaultDatabase": null,
    "DefaultVersion": "2.0.0",
    "EndPoints": [
      {
        "Host": "localhost",
        "AddressFamily": 0,
        "Port": 6379
      }
    ],
    "HighPrioritySocketThreads": true,
    "KeepAlive": -1,
    "Password": null,
    "PreserveAsyncOrder": false,
    "Proxy": 0,
    "ReconnectRetryPolicy": { },
    "ResolveDns": false,
    "ResponseTimeout": 0,
    "ServiceName": null,
    "SocketManager": null,
    "Ssl": false,
    "SslHost": null,
    "SsyProtocols": null,
    "SyncTimeout": 5000,
    "TieBreaker": "__Booksleeve_TieBreak",
    "WriteBuffer": 0,
    "ConfigCheckSeconds": 60
  },
  "InstanceName": null
},
```

```
[RetCon(typeof(IDistributedCache), ServiceLifetime = ServiceLifetime.Singleton, WhenConfigured = nameof(MockDistributedCache))]
1 reference|Jim Wilcox 1 day ago| 1 author, 1 change
public class WrappedRedisCache : RedisCache
{
    0 reference|Jim Wilcox 1 day ago| 1 author, 1 change
    public WrappedRedisCache(1Options<RedisCacheOptions> optionsAccessor) : base(optionsAccessor)
    {
    }

0 reference|Jim Wilcox 1 day ago| 1 author, 1 change
    public class Configurator : IselfConfig
```

FIG. 4C

RUNTIME DEPENDENCY CONFIGURATION UTILITY

BACKGROUND

The present invention relates generally to application dependency management, and more particularly to a system and method for automatically selecting and applying dependency implementations from among multiple candidate implementations at application execution.

Modern software applications rely heavily upon the composition of smaller, modular software workflows. These software workflows generally have dependencies on other components, such as hardware and Operating System (OS) platform features, web services, other internal components, and databases. In many well designed cases, such workflow dependencies are accessed indirectly by means of well-known interfaces. Each such interface is a generic abstraction which models types of computer workflows without specific dependencies. Because such interface are dependency-agnostic (loosely-coupled), further dependency-specific implementation selection and configuration information must be included in the application to enable actual execution of each such workflow. The choice of dependency-specific workflow implementations are commonly hardcoded and must be manually updated or replaced when dependencies change, even when the interfaces involved are not altered. There exists a need for improvements to dependency implementation selection and configuration to promote infrastructure agility and reduce manual re-work needed when application dependencies are amended.

SUMMARY

In one aspect, the present disclosure is directed toward a method is of executing an application having multiple mutually-exclusive possible dependencies associated with an interface. First, a repository of implementations is scanned using a configuration utility to identify a subset of the implementations tagged for usability with the configuration utility. The configuration utility identifies keys within each of the subset of implementations, and filters the implementations by these configuration keys. The configuration utility scans configurations for a match with any of the identified configuration keys, and selects one implementation from among the subset of the implementations for dependency injection based on matching of configurations with the identified configuration keys. The configuration utility then injects a dependency using the selected implementation, and initializes configurations specific to the injected dependency.

In another aspect, the present disclosure is directed toward an application including application configurations, an interface alternatively operable with a plurality of dependencies, a library of implementations, and a configuration utility. The library contains implementations each of which is operable to apply the interface to one of the dependencies, and at least a subset of the implementations containing a configuration key. The configuration utility searches the implementations to assemble a set of the configuration keys each associated with one of the implementations, and identifies any matches within the application configurations to any of the set of configuration keys. The configuration utility then selects one of the implementations for dependency injection based on the identification of any matches, locks in the selected implementation with associated configurations, and implements components of the associated dependency when the application runs.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIGS. 4a, 4b, and 4c are illustrations of sample configuration information with corresponding associated implementation information.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a method and utility for applying dependency-specific implementations at application initialization based on the present state of configuration information. More specifically, this disclosure provides a method of executing an application having multiple mutually-exclusive possible interface-workflow implementations, each having associated dependencies. According to this method, a repository of libraries of implementations is first scanned using a configuration utility to catalog the set of all available interface implementations. The configuration utility then identifies keys within each of the subset of implementations and filters the implementations by these configuration keys. The configuration utility scans standard application configurations for a key match (or for the absence of any match) with any of the implementation configuration keys, and selects the "best" single implementation for each interface from among the subset of the implementations for dependency injection. In some embodiments the configuration utility can also supply standard configuration to the implementation for its dependencies. If a dependency requires executing a special start-up initialization, the configuration utility can trigger the execution of that dependency's start-up initialization. The configuration utility then adds the configured and initialized implementation to the application's standard platform dependency injection ("DI") container. Since selected implementations may themselves be composed of other abstracted workflow interfaces, application dependency composition can be broadly and deeply defined by the standard main application configuration. The platform DI framework then separately injects dependency-specific implementations into core application workflows and sub-workflows using the provided implementation(s).

The approach presented herein promotes agility in application development by allowing interface implementations for anticipated alternative dependencies to be pre-built, with specific implementations selected at application startup based on configuration information already separately necessary to support the specified dependencies. This approach reduces the need for hardcoded implementations to be revised when dependencies are altered, and is particularly useful when moving between environments, e.g. local vs. web-based; test vs. deployment.

Figure 1:
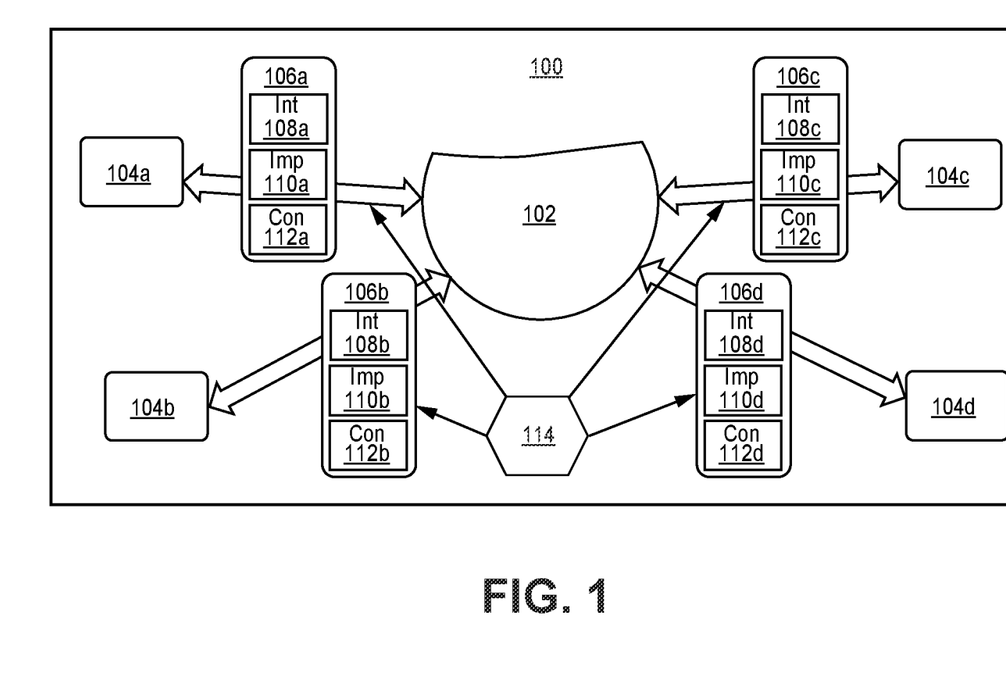
FIG. 1 is a functional block diagram illustrating components of a software application, including multiple dependencies.

FIG. 1 is a functional block diagram of a simplified application 100 with multiple dependencies. Application 100 includes core 102 dependent upon multiple dependencies 104a-d (collectively dependencies 104). In the most general case, core 102 can include any and all functional components of application 100 except dependencies 104 and elements necessary for implementation thereof or communication therewith.

Dependencies 104 can be any sort of direct software or other computer-implemented instructions called by core 102. Application 100 can have multiple mutually exclusive alternative interface-workflow implementations, each having associated dependencies among dependencies 104. In one illustrative example dependency 104a can, for example, be an external database or web service used by core 102 to store data. In another illustrative example, dependency 104b can, for example, be a code library, package, or model. Although FIG. 1 only illustrates direct dependencies 104, any of dependencies 104 can in turn have its own transitive dependencies. Although such second-, third-, etc. order dependencies are not addressed in detail in this disclosure, the approaches set forth herein can also be applied to transitive dependencies. FIG. 1 is a simplified functional diagram; application 100 can include a wide range of elements not explicitly set forth herein, and the functional components described herein can be implemented via a range of hardware and software structures without departing from the scope or spirit of the present disclosure.

As illustrated in FIG. 1, core 102 interfaces with each dependency 104 via a respective dependency-related package 106 (i.e. 106a-d). Each dependency-related package 106 is a functionally-defined grouping encompassing all information required for core 102 to interface with and make use of a respective dependency 104. Dependency-related packages 106 each include an interface 108, an implementation 110, and configurations 112. Interfaces 108 can, for example, be well-defined interfaces with common definitions used by a broad range of dependencies 104. Implementations 110 are dependency-specific software applying interfaces 108 to particular dependencies 104. Configurations 112 are application settings including specifications of particular dependencies called by core 102. Although multiple configurations 112a-d are shown in FIG. 1, each dependency 104 need not have a corresponding dedicated configuration file or section. Most generally, configurations 112 can be collectively provided in one location (e.g. one file), or in any number of function-specific locations accessible to core 102.

FIG. 1 also illustrates configuration utility 114. As described in detail hereinafter, configuration utility 114 scans configurations 112 and selects specific implementations 110 for dependency injection from among all configured implementations 110 (other implementations not shown in FIG. 1; see FIGS. 2a and 2b) based on keys (e.g. dependency-specific keys) recognized within configurations 112.

Figure 2A:
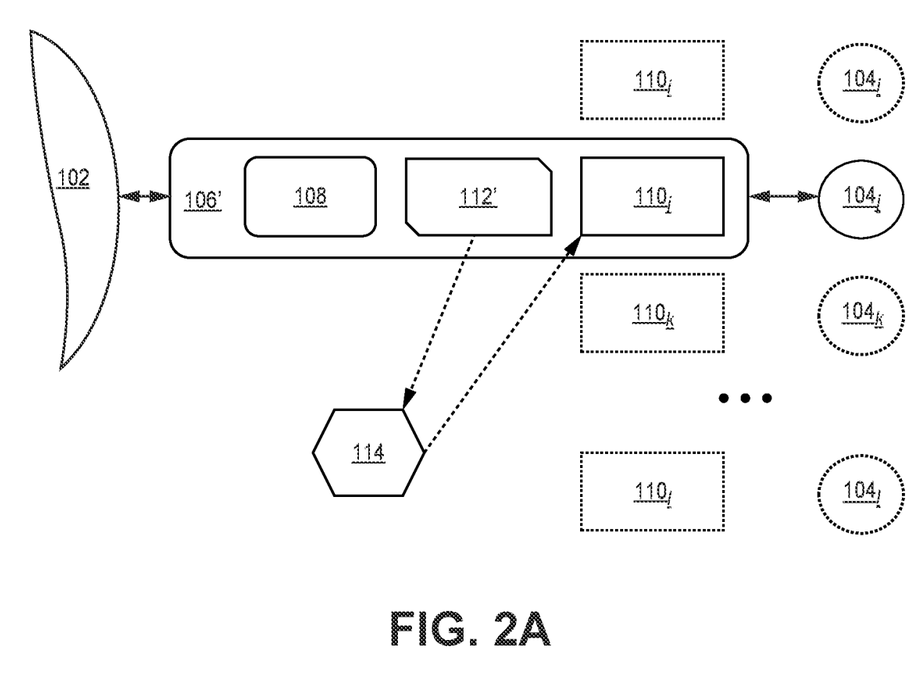
FIGS. 2a and 2b are functional block diagrams illustrating alternative cases of selection between dependency configurations, shown in parallel.
Figure 2B:
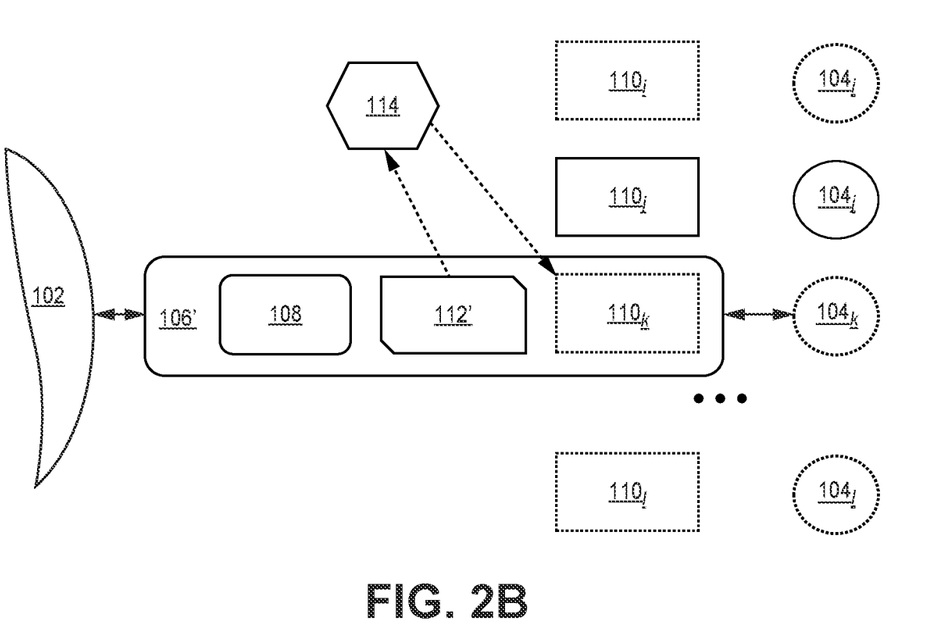

FIGS. 2a and 2b are functional block diagrams illustrating subsets of application 100 with alternative versions of a dependency-related package 106 labeled as 106' and 106", respectively. More specifically, FIGS. 2a and 2b illustrate versions or instantiations of a section of application 100 wherein configuration utility 114 is used to incorporate different application-specific implementations based on differences in configurations 112 (112' vs 112") to facilitate use of different dependencies 104 via the same interface 108. FIGS. 2a and 2b represent mutually exclusive executions of application 100. Configuration utility 114 facilitates agile pivoting between the embodiments of FIGS. 2a and 2b at application launch, as described in detail below.

Core 102, interface 108, and configuration utility 114 function as described generally above with reference to FIG. 1, and can be identical between FIGS. 2a and 2b. In an illustrative example carried through in subsequent figures, interface 108 can be the IDistributedCache well-defined interface in both FIG. 2a and FIG. 2b. Implementations $110_{i-l}$ are dependency-specific implementations of interface 108 corresponding to dependencies $104_{i-l}$, respectively. In an illustrative embodiment discussed further with reference to FIGS. 4a-4c, for example, dependency 104j can be a MockDistributedCache, dependency 104k a Redis cache, and dependency $104_l$ a pass-through alternative used as a default implementation.

FIG. 2a illustrates the operation of configuration utility 114 with dependency-related package 106', while FIG. 2b illustrates the operation of configuration utility 114 with dependency-related package 106". Specifically, dependency-related package 106' includes configurations 112' with configuration data specific to dependency 104j, while dependency-related package 106" includes configurations 112" with configuration data specific to dependency 104k. As illustrated collectively by FIGS. 2a and 2b, dependencies $104_{i-l}$ are mutually exclusively compatible with interface 108 through corresponding implementations $110_{i-l}$. FIGS. 2a and 2b together represent a design space within which multiple implementations $104_{i-l}$ are available to be called, and in which the selection and activation of a particular implementation 104 is handled by configuration utility 114. In the example provided by FIG. 2a core 102 calls dependency 104j, while in the example provided by FIG. 2b core 102 calls dependency 104k. In both examples both dependencies may be (but need not be) available, and both implementations 110j,k are provided, already pre-built as of the time of application execution, e.g. via a single library or through multiple libraries accessible to core 102.

Figure 3:
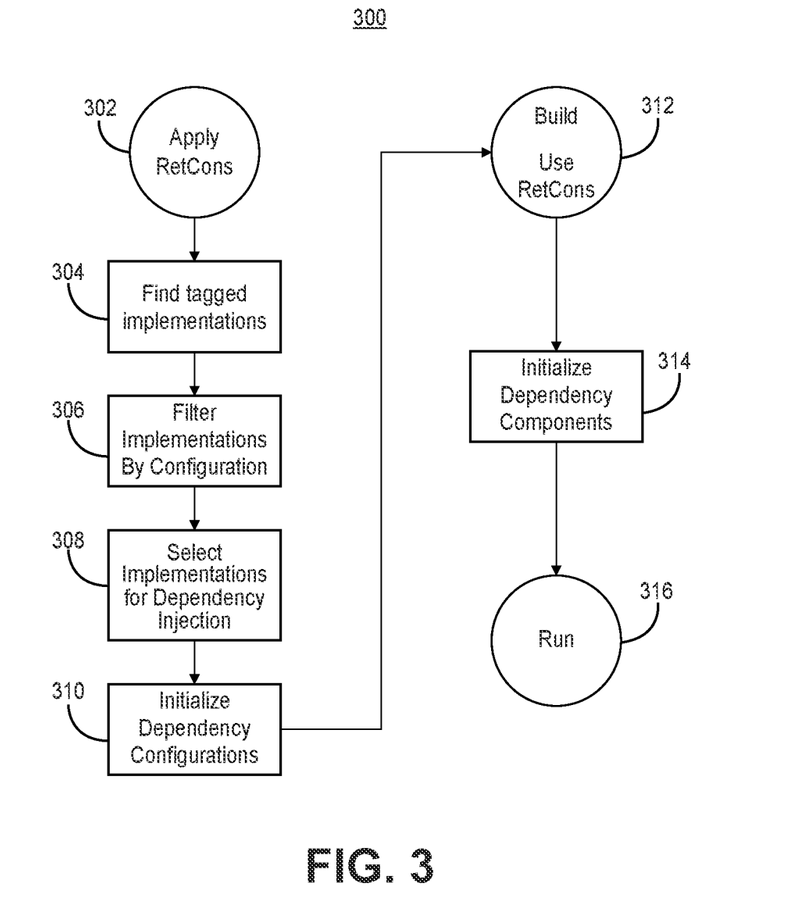
FIG. 3 is a process flowchart illustrating a method of initializing an application using a runtime dependency configuration utility.
Figure 4A:
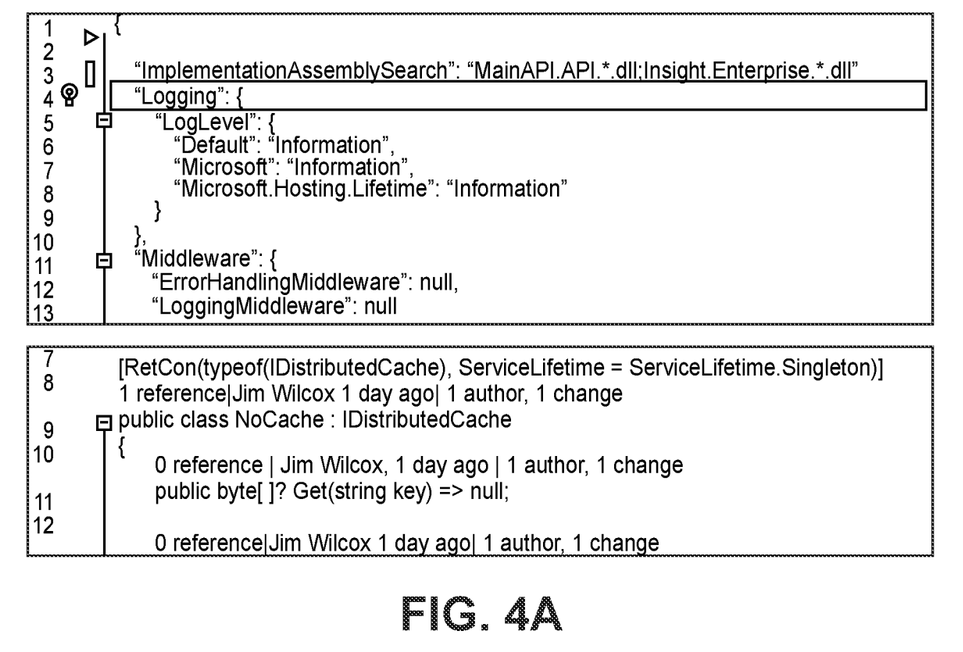
Figure 4B:
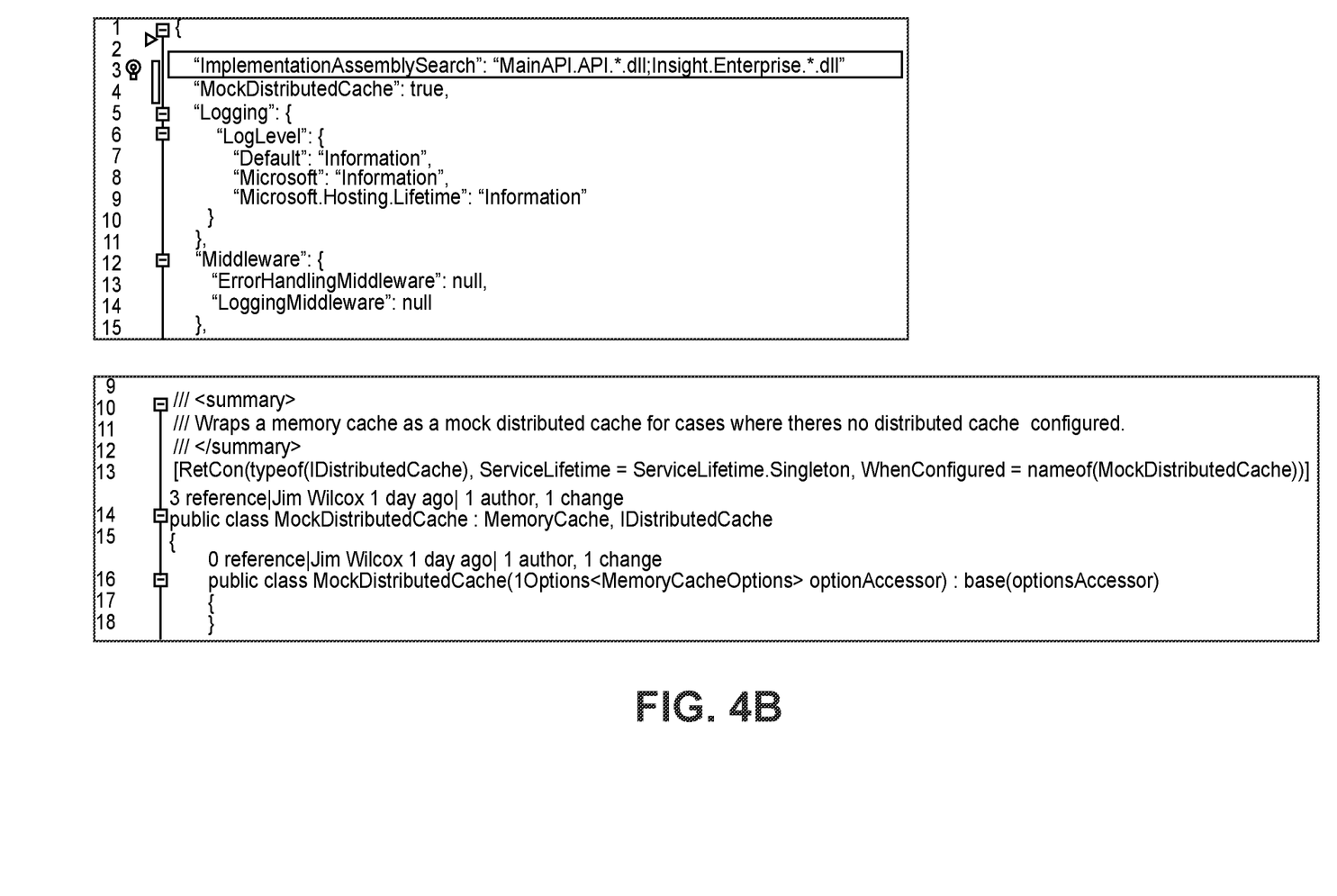

The use of configuration utility 114 to select and manage the calling of a specific dependency 104 based on configurations 112 is illustrated in FIG. 3 via method 300, which will be described herein by reference to FIGS. 2a and 2b. FIGS. 4a, 4b, and 4c are provided as examples of configuration information and corresponding associated implementation information for explication of method 300.

Method 300 is a software method executed at initiation of a runtime of application 100. In a first stage of method 300, configuration utility 114 applies RetCons (Step 302), defined herein as amendments to (i.e. away from) default implementations of interface 108. In one embodiment consistent with FIGS. 2a and 2b, this default implementation can, for example, be a minimal implementation $110_i$ of a pass-through dependency $104_i$ that permits application 100 to execute but is not otherwise functional. In a general case, however, any dependency suitable for implementation via interface 108 can be used as a default implementation. In applying a RetCon, configuration utility 114 selects a different implementation based on the contents of both configurations 112 and the full library of implementations 110, as set forth below.

The application of RetCons begins with the identification of implementations tagged for RetCon use. (Step 304). Specifically, configuration utility 114 scans all libraries of implementations, containing e.g. implementations $110_{i-l}$, available to application 100 for tags identifying each respective implementation as suitable for RetCon use. In this step, configuration utility 114 catalogs the set of all available interface implementations 110 based on recognition of these tags. This scanning can, for example, involve searching local DLL libraries or other repositories. Some implementations may not be tagged for RetCon use, in which case these implementations will not be accessible to configuration utility 114. Interface implementation need not be entirely delegated to configuration utility 114, however; some dependencies (e.g. 104$a,b$; see FIG. 1) may be called via implementations (correspondingly 110$a,b$) determined by configuration utility 114, while others (e.g. 104$c,d$) may be called via implementations (correspondingly 110$c,d$) that are hard-coded (that is, provided independently of configuration utility 114, prior to compiling application 100) or otherwise provided independently of configuration utility 114. Accordingly, implementations not tagged for RetCon use (e.g. $110_l$, in the present example) may still be used in other instances. In the illustrated examples provided in FIGS. 2$a$, 2$b$, and 2$c$, the tagging of implementations for RetCon use takes the form of the presence of a function RetCon( . . . , . . . ) within the implementation.

Configuration utility 114 next identifies configuration keys in implementations tagged for RetCon use, and filters implementations by these keys. (Step 306). FIGS. 2$a$, 2$b$, and 2$c$ illustrate sample portions of implementation 110 (right) and associated sample portions of configuration 112 (left). FIG. 2$a$ illustrates a pass-through implementation ($110_i$, carrying on the example provided above) with a corresponding configuration ($112_i$, according to the same example). As shown in FIG. 2$a$, this pass-through implementation is implemented as a default, rather than based on the identification of any specific configuration key. By contrast, FIGS. 2$b$ and 2$c$ illustrate implementations ($110_j$ and $110_k$) and sections of associated alternative configuration information ($112_j$ and $112_k$) for a MockDistributedCache ($104_j$) and a Redis cache ($104_k$), respectively, with keys by which the configuration utility recognizes and selects those respective implementations as an override to default implementation $110_i$. In the illustrated examples, these keys are the terminal arguments of the example RetCon functions: WhenConfigured=nameof(MockDistributedCache) for the mock distributed cache implementation ($110_j$), and WhenConfigured=nameof(RedisCacheOptions) for the Redis cache implementation ($110_k$). More generally, however, these keys can take any form configuration utility 114 is programmed to recognize.

The configuration keys identified by configuration utility 114 from among implementations 110 tagged for RetCon define the set of possible implementations 110 for interface 108. Configuration utility 114 scans standard application configurations 112 for a key match (or absence of any match) with any of the identified implementation configuration keys, and selects one of these implementations 110 for dependency injection based on this matching. (Step 308). Specifically, configuration utility 114 selects the "best" single implementation for each interface from among the subset of the implementations available for dependency injection. In a simple case the "best" implementation can be the first implementation with a key matched in application configurations 112. More generally, however, any approach to specifying the a preference or priority order of implementations can be used. In some examples, configuration utility 114 may be provided in advance with a prioritization of possible implementations, or may extract a prioritization from scanned configurations. If no matches are found, the default implementation (i.e. $110_i$ in the ongoing example) is used. If a match is found for only one configuration key, that configuration is used. Implementations selected for dependency injection are added to a dependency injection (DI) container (i.e. a lookup list of sub-workflows described by dependency-associated implementations). If a particular dependency requires executing any special related start-up initialization, configuration utility 114 can trigger execution of that dependency's start-up initialization and add the configured and initialized implementation the standard DI container of application 100. In some instances, initialization of a selected implementation can include initialization of a platform feature via a stub implementation consisting of an implementation including only initialization workflow. Since selected implementations may themselves be composed of other abstracted workflow interfaces, application dependency composition can be broadly and deeply defined by the standard main application configuration. The platform DI framework then separately injects dependency-specific implementations into core application workflows and sub-workflows using the selected provided implementation(s), and initializes configurations specific to the injected dependency.

Unlike in conventional approaches, wherein the DI container is preconfigured for configuration and initialization of specific implementations when compiling the application, RetCons allow the DI container to be composed dynamically at application startup. According to the method set forth herein, the composition of the DI container is specified by the application's already-existing regular application configuration. In some embodiments, configuration utility 114 can supply a standard configuration for the implementation of its dependencies.

FIGS. 4$a$ and 4$b$ illustrate examples of keys occurring in configurations 112 at lines 4. If configurations 112 contain configuration keys corresponding to multiple implementations recognizable by configuration utility 114, only one will be selected for dependency injection. In some embodiments, configuration utility 114 can, for example, select the implementation containing the configuration key first identified in configurations 112, and report a (non-breaking) error noting that other configurations were also provided, but not used. In other embodiments, configuration utility 114 can select from among multiple available implementations indicated by the presence of corresponding configuration keys in configurations 112 through a preset or conditional prioritization of implementations, e.g. preferring to initialize a Redis cache, if configured, over a mock distributed cache, regardless of order.

Once a dependency 104 and its associated implementation 110 have been selected by matching configuration keys found in configurations 112, application 100 can enter build, locking-in implementations and configs. (Step 312). At this stage, configuration utility 114 initializes any dependency components corresponding to selected dependency component 110 (Step 314), starting the locked-in implementations (using RetCons), e.g. establishing connections or otherwise preparing application itself to run (Step 316).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of executing an application having multiple possible, mutually-exclusive injectable dependencies associated with an interface, each injectable dependency comprising computer-implementable and -executable instructions, the method comprising:
scanning a repository of implementations to identify a subset of the implementations tagged for usability with a configuration utility, each implementation consisting of dependency-specific software configured to apply the interface to at least one respective injectable dependency;
identifying configuration keys within each of the subset of implementations using the configuration utility, and filtering the implementations by the configuration keys;
scanning configurations for a match with any of the identified configuration keys, after scanning the repository of implementations and identifying the configuration keys, the configurations comprising a file or set of files specifying application settings including identifications of dependencies for injection at execution of the application;
selecting one respective implementation from among the subset of the implementations for dependency injection based on matching of the configurations with the identified configuration keys after scanning the configurations for the match with any of the identified configuration keys;
injecting a dependency using the selected implementation;
initializing configurations specific to the injected dependency; and
running the application, thereby implementing a component or components of the associated dependency using the selected implementation according to the associated configurations when the application is run.

2. The method of claim 1, wherein the repository comprises an implementation library.

3. The method of claim 1, wherein scanning the repository of implementations comprises identifying a RetCon tag within each of the subset of the implementations tagged for usability with the configuration utility, the RetCon tag identifying at least one of a default implementation and a configuration associated with the at least one default implementation.

4. The method of claim 1, further comprising, in order:
selecting the respective implementation for dependency injection;
initializing the respective implementation together with the configurations; and
running the application.

5. The method of claim 4, wherein initializing the respective implementation together with the configurations comprises initializing dependency components associated with the selected implementation.

6. The method of claim 5, wherein initializing the respective implementation together with the configurations further comprises initializing a platform feature via a stub implementation.

7. The method of claim 1, wherein scanning the repository of implementations to identify the subset of the implementations tagged for usability with the configuration utility comprises scanning the implementations within the repository of implementations for a presence of a function recognizable by the configuration utility.

8. The method of claim 7, wherein the configuration keys are arguments or portions of arguments of the function.

9. The method of claim 8, wherein identifying the configuration keys comprises forming a set of all configuration keys occurring within any of the implementations tagged for usability with the configuration utility, and wherein scanning the configurations for the match with any of the identified configuration keys comprises searching the configurations for any matches to members of the set of all configuration keys.

10. The method of claim 1, wherein selecting one implementation from among the subset of the implementations for dependency injection comprises selecting a default implementation without a matching configuration key in an event that no configuration key identified by the configuration utility from within the subset of implementations is matched within the configurations.

11. The method of claim 1, wherein selecting one implementation from among the subset of the implementations for dependency injection comprises selecting a sole implementation having a configuration key matched within the configurations.

12. The method of claim 1, wherein selecting one implementation from among the subset of the implementations for dependency injection comprises selecting an implementation having a configuration key first matched by the configuration utility within the configurations, and further comprising reporting an error, informing that other configurations were provided but not used, in response to the configuration utility matching additional configuration keys within the configurations.

13. The method of claim 1, wherein initializing configurations specific to the injected dependency comprises establishing a start-up initialization specific to the respective implementation.

14. At least one non-transitory machine-readable medium instantiated with instructions that, when executed by a processor, cause the processor to perform operations, the operations comprising:
launching an application, the application comprising:
application configurations;
an interface alternatively operable with a plurality of dependencies;
a library of implementations each operable to apply the interface to an associated dependency of the plurality of dependencies, at least a subset of the implementations containing a configuration key; and
a configuration utility;
searching, by the configuration utility, the implementations to assemble a set of the configuration keys each associated with one of the implementations;
identifying, by the configuration utility, any matches within the application configurations to any of the set of configuration keys, the application configurations comprising a file or set of files specifying application settings including identifications of dependencies for injection at execution of the application;

selecting, by the configuration utility, one of the implementations for dependency injection based on the identification of any matches;

injecting, by the configuration utility, a dependency using the selected implementation;

initializing, by the configuration utility, configurations specific to the injected dependency; and running the application, thereby implementing components of the associated dependency using the selected implementation according to the configurations specific to the injected dependency when the application is run.

15. The application of claim 14, wherein the library of implementations contains a default implementation selected by the configuration utility for dependency injection in response to no matches being available within the application configurations to any of the set of configuration keys.

16. The application of claim 15, wherein the selection of one of the implementations for dependency injection comprises substituting an implementation having a configuration key matched within the application configurations in place of the default implementation.

17. The application of claim 14, further comprising an application core configured to call the dependency injected by the configuration utility, using the interface and the selected implementation.

18. The application of claim 14, wherein searching the implementations to assemble the set of the configuration keys comprises:

scanning at least one library of implementations; and identifying a RetCon tag associated with at least one implementation within the at least one library of implementations.

19. A system for executing an application having multiple possible, mutually exclusive injectable dependencies, each injectable dependency associated with an interface, the system comprising:

a non-transitory computer readable medium;

computer readable instructions stored on the non-transitory computer readable medium; and a processor configured to execute the computer readable instructions at an application runtime to:

scan a library of implementations using a configuration utility for a subset of implementations tagged for usability with the configuration utility, each implementation comprising dependency-specific software and being associated with a respective injectable dependency, wherein each implementation is operable to apply the interface to one of the respective injectable dependencies;

identify from the subset of implementations configuration keys;

filter the subset of implementations by the configuration keys;

scan configurations for at least a respective match with a respective configuration key, the configurations comprising at least one or more files specifying application settings including identifications of dependencies for injection;

select one of the implementations having the respective configuration key having the respective match with the configuration;

inject, using the selected implementation, the respective injectable dependency associated with the selected implementations, such that the injectable dependency is implemented via the selected implementation using respective of the configurations; and run the application, thereby implementing a component or components of the associated dependency using the selected implementation according to the associated configurations when the application is run.

* * * * *